(12) United States Patent
Tengeiji et al.

(10) Patent No.: US 8,013,930 B2
(45) Date of Patent: Sep. 6, 2011

(54) IMAGING APPARATUS AND EXPOSURE CONTROL METHOD USED FOR THE SAME

(75) Inventors: Hideki Tengeiji, Kanagawa-ken (JP); Etsuo Shima, Kanagawa-ken (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 301 days.

(21) Appl. No.: 12/457,883

(22) Filed: Jun. 24, 2009

(65) Prior Publication Data
US 2009/0322902 A1     Dec. 31, 2009

(30) Foreign Application Priority Data

Jun. 27, 2008  (JP) ............................... P2008-169007
Apr. 9, 2009   (JP) ............................... P2009-094629

(51) Int. Cl.
*H04N 5/238*     (2006.01)
*H04N 5/225*     (2006.01)

(52) U.S. Cl. ..................... 348/360; 348/229.1; 348/342; 348/361; 348/363; 348/364

(58) Field of Classification Search ............ 348/208.11, 348/208.12, 221.1, 220.1, 224.1, 360, 361, 348/362, 363, 364
See application file for complete search history.

(56) References Cited

U.S. PATENT DOCUMENTS

| 6,930,723 | B1* | 8/2005 | Tsuda et al. | 348/363 |
| 7,450,170 | B2* | 11/2008 | Terai et al. | 348/342 |
| 2007/0065135 | A1* | 3/2007 | Takei et al. | 396/241 |

FOREIGN PATENT DOCUMENTS
JP     2007-025432 A     2/2007
* cited by examiner

*Primary Examiner* — Sinh Tran
*Assistant Examiner* — Selam Gebriel
(74) *Attorney, Agent, or Firm* — The Nath Law Group; Jerald L. Meyer; Derek Richmond

(57) ABSTRACT

An imaging apparatus includes a shutter drive section, an aperture blade drive section, an ND filter drive section, a light intensity detection section, a memory, and a control section. The shutter drive section opens and closes a shutter for a light receiving surface of a solid state image sensor. The aperture blade drive section drives an aperture blade forming an aperture. The ND filter drive section adjusts the position of an ND filter against the aperture. The control section calculates the exposure control voltage representing an exposure amount from the light intensity signal output from the light intensity detection section, and reads out the F value and the shutter speed corresponding to the exposure control voltage from the exposure control table stored in the memory so as to avoid a partial application state of the ND filter, for controlling respective drive sections.

8 Claims, 7 Drawing Sheets

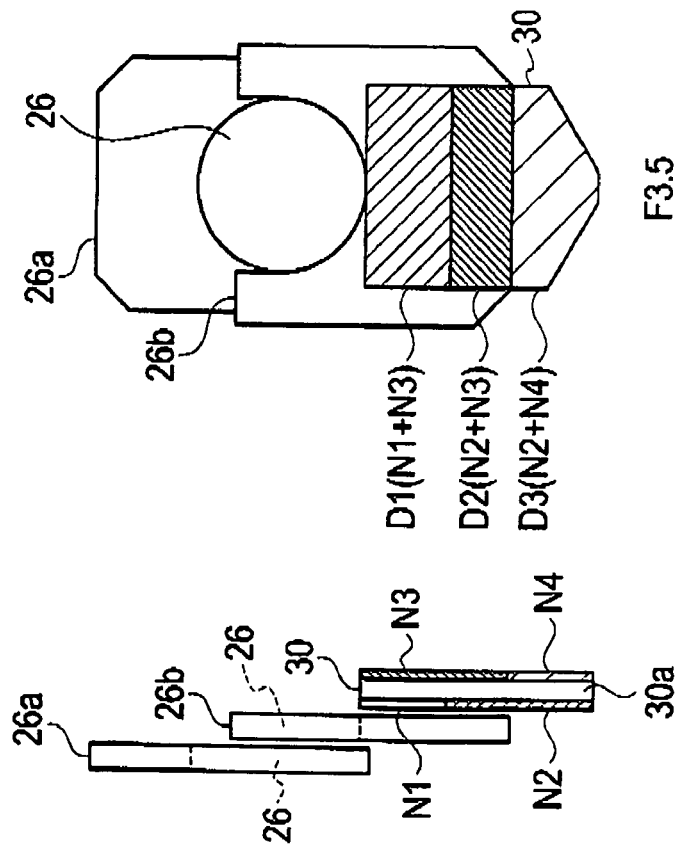
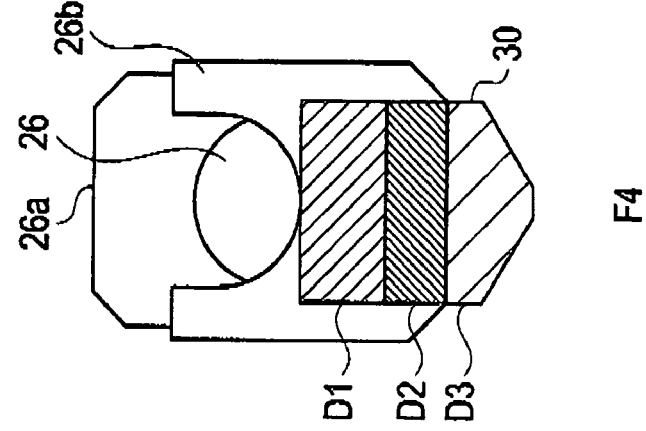
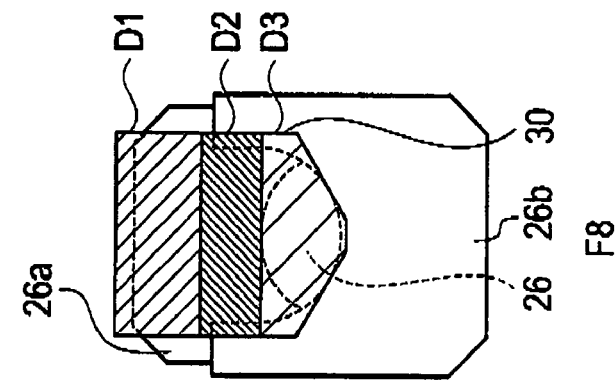

FIG. 4A
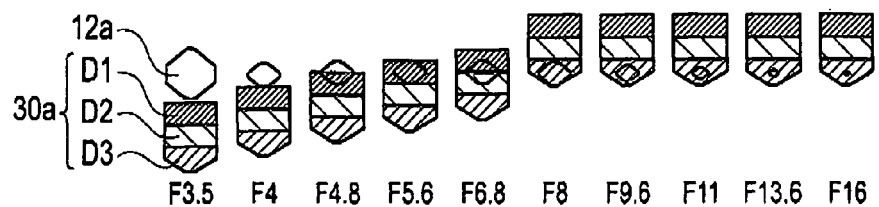
FIG. 4B
unit EV
| | | F VALUE | | | | | | | | |
|---|---|---|---|---|---|---|---|---|---|---|
| | | 3.5 | 4 | 4.8 | 5.6 | 6.8 | 8 | 9.6 | 11 | 13.6 | 16 |
| SHUTTER SPEED (s) | 2 | 2.5 | 3.0 | 3.5 | 4.0 | 4.5 | 5.0 | 5.5 | 6.0 | 6.5 | 7.0 |
| | 1.4 | 3.0 | 3.5 | 4.0 | 4.5 | 5.0 | 5.5 | 6.0 | 6.5 | 7.0 | 7.5 |
| | 1 | 3.5 | 4.0 | 4.5 | 5.0 | 5.5 | 6.0 | 6.5 | 7.0 | 7.5 | 8.0 |
| | 1/1.4 | 4.0 | 4.5 | 5.0 | 5.5 | 6.0 | 6.5 | 7.0 | 7.5 | 8.0 | 8.5 |
| | 1/2 | 4.5 | 5.0 | 5.5 | 6.0 | 6.5 | 7.0 | 7.5 | 8.0 | 8.5 | 9.0 |
| | 1/3 | 5.0 | 5.5 | 6.0 | 6.5 | 7.0 | 7.5 | 8.0 | 8.5 | 9.0 | 9.5 |
| | 1/4 | 5.5 | 6.0 | 6.5 | 7.0 | 7.5 | 8.0 | 8.5 | 9.0 | 9.5 | 10.0 |
| | 1/6 | 6.0 | 6.5 | 7.0 | 7.5 | 8.0 | 8.5 | 9.0 | 9.5 | 10.0 | 10.5 |
| | 1/8 | 6.5 | 7.0 | 7.5 | 8.0 | 8.5 | 9.0 | 9.5 | 10.0 | 10.5 | 11.0 |
| | 1/11 | 7.0 | 7.5 | 8.0 | 8.5 | 9.0 | 9.5 | 10.0 | 10.5 | 11.0 | 11.5 |
| | 1/16 | 7.5 | 8.0 | 8.5 | 9.0 | 9.5 | 10.0 | 10.5 | 11.0 | 11.5 | 12.0 |
| | 1/22 | 8.0 | 8.5 | 9.0 | 9.5 | 10.0 | 10.5 | 11.0 | 11.5 | 12.0 | 12.5 |
| | 1/32 | 8.5 | 9.0 | 9.5 | 10.0 | 10.5 | 11.0 | 11.5 | 12.0 | 12.5 | 13.0 |
| | 1/45 | 9.0 | 9.5 | 10.0 | 10.5 | 11.0 | 11.5 | 12.0 | 12.5 | 13.0 | 13.5 |
| | 1/64 | 9.5 | 10.0 | 10.5 | 11.0 | 11.5 | 12.0 | 12.5 | 13.0 | 13.5 | 14.0 |
| | 1/90 | 10.0 | 10.5 | 11.0 | 11.5 | 12.0 | 12.5 | 13.0 | 13.5 | 14.0 | 14.5 |
| | 1/128 | 10.5 | 11.0 | 11.5 | 12.0 | 12.5 | 13.0 | 13.5 | 14.0 | 14.5 | 15.0 |
| | 1/179 | 11.0 | 11.5 | 12.0 | 12.5 | 13.0 | 13.5 | 14.0 | 14.5 | 15.0 | 15.5 |
| | 1/256 | 11.5 | 12.0 | 12.5 | 13.0 | 13.5 | 14.0 | 14.5 | 15.0 | 15.5 | 16.0 |
| | 1/358 | 12.0 | 12.5 | 13.0 | 13.5 | 14.0 | 14.5 | 15.0 | 15.5 | 16.0 | 16.5 |
| | 1/512 | 12.5 | 13.0 | 13.5 | 14.0 | 14.5 | 15.0 | 15.5 | 16.0 | 16.5 | 17.0 |
| | 1/717 | 13.0 | 13.5 | 14.0 | 14.5 | 15.0 | 15.5 | 16.0 | 16.5 | 17.0 | 17.5 |
| | 1/1024 | 13.5 | 14.0 | 14.5 | 15.0 | 15.5 | 16.0 | 16.5 | 17.0 | 17.5 | 18.0 |
| | 1/1434 | 14.0 | 14.5 | 15.0 | 15.5 | 16.0 | 16.5 | 17.0 | 17.5 | 18.0 | 18.5 |
| | 1/2048 | 14.5 | 15.0 | 15.5 | 16.0 | 16.5 | 17.0 | 17.5 | 18.0 | 18.5 | 19.0 |
FIG. 4C
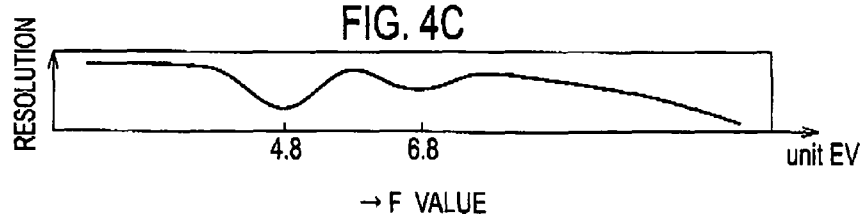

FIG. 5

| | | \multicolumn{10}{c}{F VALUE} | | | | | | | | | |
|---|---|---|---|---|---|---|---|---|---|---|---|
| | | 3.5 | 4 | 4.8 | 5.6 | 6.8 | 8 | 9.6 | 11 | 13.6 | 16 |
| SHUTTER SPEED (s) | 2 | 2.5 | 3.0 | 3.5 | 4.0 | 4.5 | 5.0 | 5.5 | 6.0 | 6.5 | 7.0 |
| | 1.4 | 3.0 | 3.5 | 4.0 | 4.5 | 5.0 | 5.5 | 6.0 | 6.5 | 7.0 | 7.5 |
| | 1 | 3.5 | 4.0 | 4.5 | 5.0 | 5.5 | 6.0 | 6.5 | 7.0 | 7.5 | 8.0 |
| | 1/1.4 | 4.0 | 4.5 | 5.0 | 5.5 | 6.0 | 6.5 | 7.0 | 7.5 | 8.0 | 8.5 |
| | 1/2 | 4.5 | 5.0 | 5.5 | 6.0 | 6.5 | 7.0 | 7.5 | 8.0 | 8.5 | 9.0 |
| | 1/3 | 5.0 | 5.5 | 6.0 | 6.5 | 7.0 | 7.5 | 8.0 | 8.5 | 9.0 | 9.5 |
| | 1/4 | 5.5 | 6.0 | 6.5 | 7.0 | 7.5 | 8.0 | 8.5 | 9.0 | 9.5 | 10.0 |
| | 1/6 | 6.0 | 6.5 | 7.0 | 7.5 | 8.0 | 8.5 | 9.0 | 9.5 | 10.0 | 10.5 |
| | 1/8 | 6.5 | 7.0 | 7.5 | 8.0 | 8.5 | 9.0 | 9.5 | 10.0 | 10.5 | 11.0 |
| | 1/11 | 7.0 | 7.5 | 8.0 | 8.5 | 9.0 | 9.5 | 10.0 | 10.5 | 11.0 | 11.5 |
| | 1/16 | 7.5 | 8.0 | 8.5 | 9.0 | 9.5 | 10.0 | 10.5 | 11.0 | 11.5 | 12.0 |
| | 1/22 | 8.0 | 8.5 | 9.0 | 9.5 | 10.0 | 10.5 | 11.0 | 11.5 | 12.0 | 12.5 |
| | 1/32 | 8.5 | 9.0 | 9.5 | 10.0 | 10.5 | 11.0 | 11.5 | 12.0 | 12.5 | 13.0 |
| | 1/45 | 9.0 | 9.5 | 10.0 | 10.5 | 11.0 | 11.5 | 12.0 | 12.5 | 13.0 | 13.5 |
| | 1/64 | 9.5 | 10.0 | 10.5 | 11.0 | 11.5 | 12.0 | 12.5 | 13.0 | 13.5 | 14.0 |
| | 1/90 | 10.0 | 10.5 | 11.0 | 11.5 | 12.0 | 12.5 | 13.0 | 13.5 | 14.0 | 14.5 |
| | 1/128 | 10.5 | 11.0 | 11.5 | 12.0 | 12.5 | 13.0 | 13.5 | 14.0 | 14.5 | 15.0 |
| | 1/179 | 11.0 | 11.5 | 12.0 | 12.5 | 13.0 | 13.5 | 14.0 | 14.5 | 15.0 | 15.5 |
| | 1/256 | 11.5 | 12.0 | 12.5 | 13.0 | 13.5 | 14.0 | 14.5 | 15.0 | 15.5 | 16.0 |
| | 1/358 | 12.0 | 12.5 | 13.0 | 13.5 | 14.0 | 14.5 | 15.0 | 15.5 | 16.0 | 16.5 |
| | 1/512 | 12.5 | 13.0 | 13.5 | 14.0 | 14.5 | 15.0 | 15.5 | 16.0 | 16.5 | 17.0 |
| | 1/717 | 13.0 | 13.5 | 14.0 | 14.5 | 15.0 | 15.5 | 16.0 | 16.5 | 17.0 | 17.5 |
| | 1/1024 | 13.5 | 14.0 | 14.5 | 15.0 | 15.5 | 16.0 | 16.5 | 17.0 | 17.5 | 18.0 |
| | 1/1434 | 14.0 | 14.5 | 15.0 | 15.5 | 16.0 | 16.5 | 17.0 | 17.5 | 18.0 | 18.5 |
| | 1/2048 | 14.5 | 15.0 | 15.5 | 16.0 | 16.5 | 17.0 | 17.5 | 18.0 | 18.5 | 19.0 |

FIG. 6A

| EXPOSURE CONTROL VOLTAGE EV | EV9 | EV9.5 | EV10 | EV10.5 | EV11 | EV11.5 | EV12 | EV12.5 | EV13 | EV13.5 | EV14 | EV14.5 | EV15 | EV15.5 | EV16 | EV16.5 | EV17 |
|---|---|---|---|---|---|---|---|---|---|---|---|---|---|---|---|---|---|
| F VALUE | 3.5 | 3.5 | 4 | 4 | 4 | 4 | 4 | 4 | 4 | 5.6 | 5.6 | 5.6 | 8 | 9.6 | 11 | 13.6 | 16 |
| SHUTTER SPEED S | 1/45 | 1/64 | 1/64 | 1/90 | 1/128 | 1/179 | 1/256 | 1/358 | 1/512 | 1/358 | 1/512 | 1/358 | 1/512 | 1/512 | 1/512 | 1/512 | 1/512 |

FIG. 6B

| EXPOSURE CONTROL VOLTAGE EV | EV17 | EV16.5 | EV16 | EV15.5 | EV15 | EV14.5 | EV14 | EV13.5 | EV13 | EV12.5 | EV12 | EV11.5 | EV11 | EV10.5 | EV10 | EV9.5 | EV9 |
|---|---|---|---|---|---|---|---|---|---|---|---|---|---|---|---|---|---|
| F VALUE | 16 | 13.6 | 11 | 9.6 | 8 | 8 | 8 | 8 | 8 | 8 | 5.6 | 4 | 4 | 4 | 4 | 3.5 | 3.5 |
| SHUTTER SPEED S | 1/512 | 1/512 | 1/512 | 1/512 | 1/512 | 1/358 | 1/256 | 1/179 | 1/128 | 1/90 | 1/90 | 1/128 | 1/90 | 1/64 | 1/64 | 1/45 |

IMAGING APPARATUS AND EXPOSURE CONTROL METHOD USED FOR THE SAME

BACKGROUND OF THE INVENTION

1. Field of the Invention

The present invention relates to an imaging apparatus and an exposure control method for the same, which adjust a position of an ND (Neutral Density) filter against an aperture for carrying out exposure control.

2. Description of the Related Art

An imaging apparatus using a solid state image sensor, such as a digital video camera or a digital still camera, carries out exposure control by adjustment of an aperture area for an imaging lens, adjustment of a position of an ND filter against an aperture, adjustment of shutter speed in opening and closing a light receiving surface of the solid state image sensor, adjustment of gain for a light intensity signal obtained from the solid state image sensor, and the like.

In the exposure control of the imaging apparatus, there is sometimes a case in which the ND filter has a state of being partially applied to the aperture (hereinafter, called "partial application state of an ND filter"). In the partial application state of the ND filter, a part of a light flux passing through the aperture is transmitted through the ND filter and the remaining part of the light flux is directly transmitted through air. Thereby, an image-forming point becomes different between the light flux transmitted through the ND filter and the light flux transmitted not through the ND filter but through only the air, and this degrades resolution of an optical object image.

The resolution of the optical object image is degraded also by light diffraction at an edge part of the ND filter. Further, the resolution of the optical object image is degraded also when at least two regions of the ND filter, which are different in optical density, are applied to the aperture. In the description hereinafter, the partial application state of the ND filter includes also a state that at least two regions of the ND filter, which are different in the optical density, are applied to the above aperture.

There is proposed an exposure control method to improve the resolution degradation of the optical object image which occurs in this partial application state of the ND filter (Japanese Patent Application Laid-Open Publication No. 2007-25432).

This exposure control method carries out the exposure control such that an exposure amount according to brightness of an object changes in a smooth straight line, when the state that the ND filter is not applied at all to the aperture (hereinafter, called "fully open state of the ND filter") is changed to the state that the ND filter is applied completely over the aperture (hereinafter, called "fully closed state of the ND filter") via the partial application state of the ND filter. However, this exposure control method carries out the exposure control even in the partial application state of the ND filter, and still has a problem of degrading the resolution of the optical object image.

The inventors of the present invention have verified the resolution degradation of the optical object image in the partial application state of the ND filter for the above exposure control method. FIG. 1 shows a relationship between the brightness of the object and the resolution (MTF: Modulation Transfer Function) in the above exposure control method. "vertical" shown in FIG. 1 indicates a direction of inserting the ND filter which is the same direction as that of opening or closing the aperture and also indicates a direction vertical to an optical axis of the imaging lens. Further, "horizontal" shown in FIG. 1 indicates a direction perpendicular to each of the optical axis direction of the imaging lens and the above "vertical" direction.

In addition, "60 lines/mm" shown in FIG. 1 is a resolution representing that 60 black-and-white stripe pairs can be resolved and drawn per 1 mm in the vertical or horizontal direction, and "150 lines/mm" is a resolution representing that 150 black-and white stripe pairs can be resolved and drawn per 1 mm in the vertical or horizontal direction. Further, "Aa" shown in FIG. 1 indicates the fully open state of the ND filter, "Ab" indicates the partial application state of the ND filter, and "Ac" indicates the fully closed state of the ND filter.

As shown in FIG. 1, in a range from "dark" to "bright" in the brightness of the object, while the vertical resolution changes in a large amount depending on the position change of the ND filter against the aperture, the horizontal resolution receives little influence from the position change of the ND filter against the aperture.

SUMMARY OF THE INVENTION

The present invention has been achieved in view of such a problem, and aims for providing an imaging apparatus and an exposure control method used for the same which are capable of carrying out an optimum exposure control without degrading the vertical resolution of an optical object image depending on the ND filter position change, even when the exposure control is carried out by using both of the adjustment of the aperture area and the adjustment of the ND filter position against the aperture.

For solving the above conventional technical problem, the present invention provides an imaging apparatus (10) including: a shutter drive section (34) opening and closing a shutter for a light receiving surface (14a) of a solid state image sensor (14); an aperture blade drive section (28) driving an aperture blade forming an aperture (26) for imaging lenses (12a, 12b, 12c, and 12d); an ND filter drive section (32) adjusting a position of an ND filter (30) against the aperture, the ND filter adjusting light intensity of an optical object image received by the light receiving surface of the solid state image sensor; a light intensity detection section (22) detecting the light intensity of the optical object image received by the light receiving surface of the solid state image sensor and outputting a light intensity signal based on the light intensity of the optical object image; a memory (38) storing an exposure control table indicating correspondence relationships among an F value determined by an area of the aperture and the position of the ND filter against the aperture, a shutter speed in opening and closing the shutter, and an exposure control voltage representing an exposure amount; and a control section (24) calculating the target exposure control voltage from the light intensity signal, reading out the F value corresponding to the exposure control voltage from the exposure control table, determining whether or not there exists a possibility of a partial application state of the ND filter, in which the ND filter is applied to a part of the aperture, when controlling the aperture blade drive section and the ND filter drive section using the F value, reading out the shutter speed corresponding to the F value from the exposure control table if the possibility of the partial application state of the ND filter is determined not to exist, reading out the F value again from the exposure control table so as to avoid the partial application state of the ND filter if the possibility of the partial application state of the ND filter is determined to exist and reading out the shutter speed corresponding to the F value which is read out again from the exposure control table, controlling the aperture blade drive section and the ND filter drive section according to the F value read out from the exposure control table, and controlling the shutter drive section according to the shutter speed read out from the exposure control table, for carrying out exposure control.

Here, the partial application state of the ND filter preferably includes a state of applying at least two regions of the ND filter to the aperture, the two regions being different in optical density.

In addition, the imaging apparatus preferably includes an amplifier (18) amplifying with a predetermined gain an electrical signal based on the light intensity of the optical object image received by the light receiving surface of the solid state image sensor, and the control section preferably determines the gain provided to the electrical signal by the amplifier and carries out control so that the amplifier provides the gain to the electrical signal, if the possibility of the partial application state of the ND filter is determined not to exist.

Further, the control section preferably calculates the exposure control voltage depending on a kind of a shot image.

The present invention also provides an exposure control method for carrying out exposure control of an imaging apparatus, the method including: detecting light intensity of an optical object image received by a light receiving surface of a solid state image sensor; outputting a light intensity signal based on the light intensity of the optical object image; calculating an exposure control voltage representing a target exposure amount from the light intensity signal; reading an F value corresponding to the exposure control voltage from a memory storing an exposure control table, which indicates correspondence relationships among the F value determined by an area of an aperture adjusted by drive of an aperture blade for an imaging lens and a position of an ND filter adjusting the light intensity of the optical object image received by the light receiving surface of the solid state image sensor, a shutter speed in opening and closing a shutter for the light receiving surface of the solid state image sensor, and the exposure control voltage; determining whether or not there exists a possibility of a partial application state of the ND filter, in which the ND filter is applied to a part of the aperture, when controlling drive of the aperture blade and the ND filter using the F value; reading out the shutter speed corresponding to the F value from the exposure control table if the possibility of the partial application state of the ND filter is determined not to exist; reading out the F value again from the exposure control table so as to avoid the partial application state of the ND filter if the possibility of the partial application state of the ND filter is determined to exist, and reading out the shutter speed corresponding to the F value which is read out again from the exposure control table; carrying out control so as to drive the aperture blade and the ND filter according to the F value read out from the exposure control table; and carrying out control so as to drive the shutter according to the shutter speed read out from the exposure control table.

Here, the partial application state of the ND filter preferably includes a state of applying at least two regions of the ND filter to the aperture, the two regions being different in optical density.

In addition, it is preferable to determine a gain of an amplifier amplifying an electrical signal which is based on the light intensity of the optical object image received by the light receiving surface of the solid state image sensor, and to carry out control so that the amplifier provides the gain to the electrical signal, if the possibility of the partial application state of the ND filter is determined not to exist.

Further, the exposure control voltage is preferably calculated depending on a kind of a shot image.

According to the present invention, in the imaging apparatus and the exposure control method using the same which carry out the exposure control using both of the adjustment of the aperture area and the adjustment of the ND filter position against the aperture, it is possible to carry out the optimum exposure control without degrading the vertical resolution of the optical object image depending on the position change of the ND filter and without depending on the brightness of the object.

BRIEF DESCRIPTION OF THE DRAWINGS

FIGS. 3A to 3D are diagrams illustrating a configuration example of an ND filter according to an embodiment of the present invention and position changes of the ND filter against an aperture.

FIGS. 4A to 4C are diagrams illustrating a data content example of an exposure control table according to an embodiment of the present invention.

FIG. 5 is a program chart showing an example of exposure control according to an embodiment of the present invention.

FIGS. 6A and 6B are diagrams illustrating relationships between an F value for avoiding a partial application state of the ND filter and a shutter speed according to an embodiment of the present invention.

DESCRIPTION OF THE PREFERRED EMBODIMENTS

Hereinafter, an embodiment for an imaging apparatus of the present invention will be described using FIGS. 2 to 7.

Figure 1:
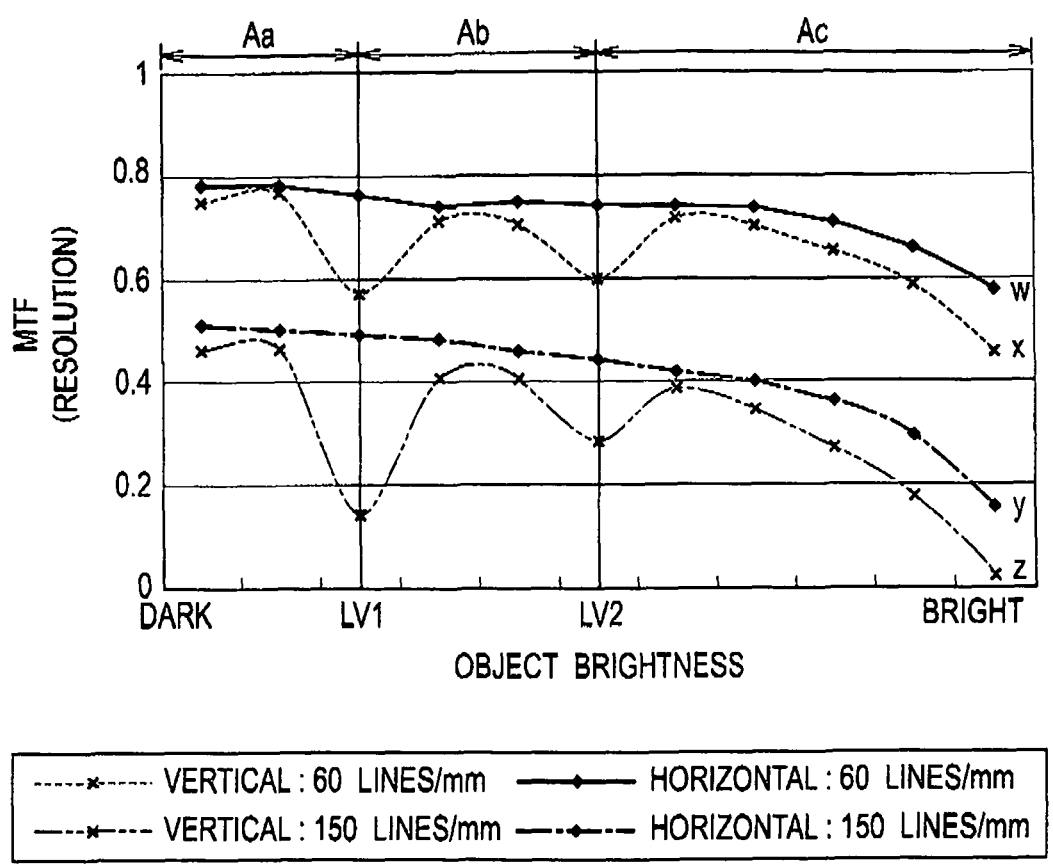
FIG. 1 is a diagram illustrating a relationship between the brightness of an object and a resolution in a conventional imaging apparatus.
Figure 2:
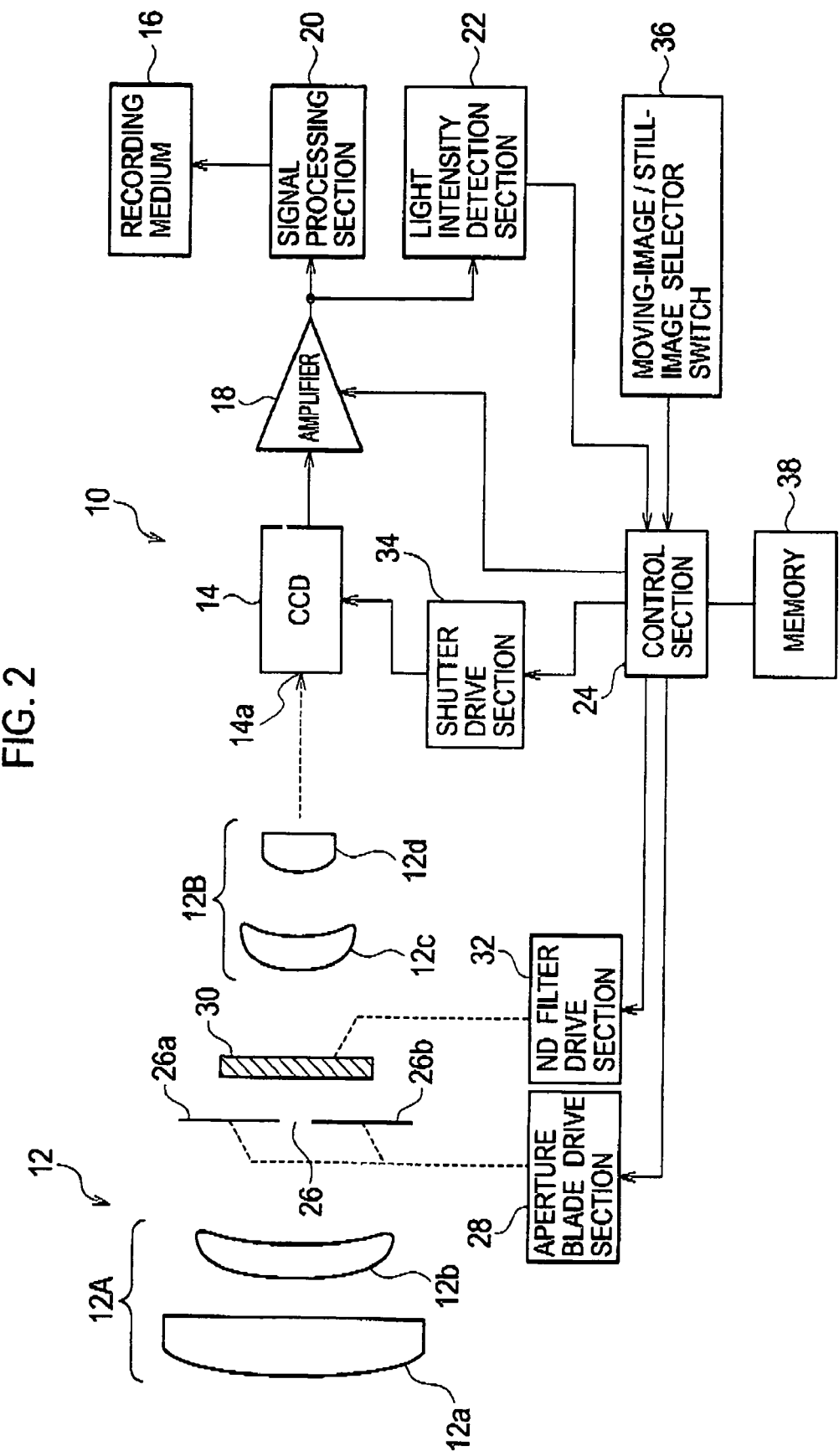
FIG. 2 is a block diagram showing a configuration of an imaging apparatus according to an embodiment of the present invention.

An imaging apparatus 10 shown in FIG. 2 includes an imaging lens group 12, a CCD (Charge Coupled Device) 14 which is a solid state image sensor, a recording medium 16, an amplifier 18, a signal processing section 20, a light intensity detection section 22, a control section 24, a pair of aperture blades 26a and 26b, an aperture blade drive section 28, an ND filter 30, an ND filter drive section 32, a shutter drive section 34, a moving-image/still-image selector switch 36, and a memory 38. While the above recording medium 16 will be described hereinafter as a part of a configuration of the imaging apparatus 10, the recording medium 16 may be excluded from the configuration of the imaging apparatus 10 and a removable type recording medium may be attached as needed from outside to the imaging apparatus having excluded the recording medium.

The imaging lens group 12 includes a first imaging lens group 12A composed of imaging lenses 12a and 12b and a second imaging lens group 12B composed of imaging lenses 12c and 12d, for guiding the optical object image to the CCD 14. The pair of aperture blades 26a and 26b and the ND filter 30 are disposed between the first imaging lens group 12A and the second imaging lens group 12B. Note that the imaging lens group may be composed of at least one imaging lens, and one of the first imaging lens group and the second imaging lens group may be omitted from the configuration.

The imaging lens group 12 is appropriately exposure-controlled by the pair of aperture blades 26a and 26b and the ND filter 30, and collects the light from the object. The light collected by the imaging lens group 12 is received by a light receiving surface 14a of the CCD 14 as the optical object image.

The CCD 14 carries out photo-electric conversion from the received optical object image to an electrical signal and supplies the electrical signal to the amplifier 18. Under the control of the control section 24, the amplifier 18 amplifies the electrical signal supplied from the CCD 14 by providing a predetermined gain, and supplies the electrical signal after amplification to the signal processing section 20 and the optical intensity detection section 22.

The signal processing section 20, when having received a storage instruction from a storage instruction switch which is not shown in the drawing, performs predetermined signal processing on the electrical signal supplied from the amplifier 18, supplies to the recording medium 16 an image signal after the predetermined signal processing has been performed, and controls the recording medium 16 so as to store the image signal.

The light intensity detection section 22 detects the object brightness from the electrical signal supplied from the amplifier 18, and supplies a light intensity signal, which is a signal representing the object brightness, to the control section 24.

The moving-image/still-image selector switch 36 is a switch to be operated by a user for switching a moving image shooting mode and a still image shooting mode. When the user selects a shooting mode of a moving image or the still image, the moving-image/still-image selector switch 36 supplies a mode signal based on the selected shooting mode to the control section 24.

The control section 24 calculates an exposure control voltage representing a target exposure amount from the light intensity signal supplied from the light intensity detection section 22 and the mode signal supplied from the moving-image/still-image selector switch 36. Note that the exposure control voltage may be determined only by the light intensity signal. Then, the control section 24 determines a combination of an F value and a speed in driving a shutter not shown in the drawing (hereinafter called "shutter speed"), which combination provides the calculated exposure control voltage. Further, the control section 24 controls the aperture blade drive section 28, the ND filter drive section 32, and the shutter drive section 34, and carries out the exposure control according to the change of the object brightness. That is, the control section 24 controls the aperture blade drive section 28 and the ND filter drive section 32 so as to provide the predetermined F value, and controls the shutter drive section 34 so as to provide the predetermined shutter speed.

The aperture blade drive section 28 drives the aperture blades 26a and 26b under the drive control of the control section 24, and the aperture area of the aperture 26 is adjusted almost continuously so as to have a predetermined area. Note that the almost continuous adjustment includes an adjustment which has a so small step amount as to be regarded as continuous, in addition to a completely continuous adjustment. Then, the aperture blade drive section 28 carries out the drive control of the aperture blades 26a and 26b to enable an adjustment from the state that the aperture 26 is opened (hereinafter, called "open state") to the state that the aperture 26 is narrowed down (hereinafter, called "narrowed-down state").

The ND filter drive section 32 drives the ND filter 30 under the drive control of the control section 24, and changes the position of the ND filter 30 against the aperture 26. Hereinafter, the position of the ND filter 30 against the aperture 26 is called an appearance state of the ND filter 30. Further, the state that the ND filter 30 is not applied at all to the aperture 26 is called a fully open state of the ND filter, the state that the ND filter 30 is partially applied to the aperture 26 is called the partial application state of the ND filter, and the state that the ND filter 30 is applied completely over the aperture 26 is called a fully closed state of the ND filter. Then, the ND filter drive section 32 carries out the drive control of the ND filter 30 and enables an adjustment from the fully open state of the ND filter to the fully closed state of the ND filter via the partial application state of the ND filter.

Note that the partial application state of the ND filter also includes the state that at least two regions of the ND filter 30, which are different in the optical density, are applied to the aperture 26.

The shutter drive section 34 controls the speed of the shutter disposed over the light receiving surface 14a of the CCD 14 under the drive control of the control section 24.

Next, a specific configuration example of the ND filter 30 will be described. FIGS. 3A to 3D are diagrams illustrating the configuration example of the ND filter according to an embodiment and change in the appearance state of the ND filter against the aperture.

As shown in FIG. 3A, the ND filter 30 is disposed in almost parallel and close to the pair of aperture blades 26a and 26b. For example, the surface of a substrate 30a in the ND filter 30 on the side of the aperture blades 26a and 26b is divided into two divisions; a region N1 and a region N2. Then, on the surfaces of the region N1 and the region N2 are formed optical thin films having optical densities different from each other. Note that the optical density value of the optical thin film formed on the region N2 is larger than that of the optical thin film formed on the region N1.

Further, the surface of the substrate 30a in the ND filter 30 on the side of the CCD 14 is divided into two divisions; a region N3 and a region N4. Then, the area of the region N3 is larger than that of the region N1 and the area of the region N4 is smaller than that of the region N2. Further, on the surfaces of the region N3 and the region N4 are formed optical thin films different from the optical thin films formed on the regions N1 and N2 in the optical density, respectively. Note that the optical density of the optical thin film formed on the region N3 is larger than that of the optical thin film formed on the region N2, and the optical density of the optical thin film formed on the region N4 is larger than that of the optical thin film formed on the region N3.

Light transmission will be considered for the case that light is transmitted through the ND filter 30, which has the optical thin films formed on the above respective regions having different optical density values, from the side of the aperture blades 26a and 26b in the direction perpendicular thereto (optical axis direction). In this case, as shown in FIG. 3B, the ND filter 30 includes three kinds of filters; a filter D1 for the light transmitted through the region N1 and the region N3, a filter D2 for the light transmitted through the region N2 and the region N3, and a filter D3 for the light transmitted through the region N2 and the region N4. In the description hereinafter, the ND filter 30 includes the filters D1 to D3 which are different from each other in the optical density value. Note that the optical density value of the second filter D2 is larger than that of the first filter D1, and the optical intensity value of the third filter D3 is larger than that of the second filter D2.

FIGS. 3B to 3D are diagrams each showing the F value, the area of the aperture 26 determined by the pair of aperture blades 26a and 26b, and the appearance state of the ND filter 30 shown in FIG. 3A against the aperture 26.

FIG. 3B shows an example in which the F value is set to 3.5, and shows that the aperture 26 is in the open state and also the ND filter is in the fully open state. Note that, in the following description, the F value of 3.5 is denoted by F3.5, for example. FIG. 3C shows an example of F4, and shows that the aperture 26 is narrowed down by a predetermined number of steps and also the ND filter is in the fully open state. FIG. 3D shows an example of F8, and shows that the aperture 26 is narrowed down by a predetermined number of steps and also the ND filter is in the fully closed state by use of the filter D3.

Next, a determination method will be described for the F value, which determines the state of the aperture 26 and the appearance state of the ND filter 30, and for the shutter speed S. The control section 24 determines the exposure control voltage EV (Exposure Value), which provides the exposure amount, according to the mode signal supplied from the moving-image/still-image selector switch 36 and the light intensity signal supplied from the light intensity detection section 22. Note that the control section 24 may determine the exposure control voltage EV only by using the light intensity signal without using the mode signal.

FIG. 4A is a diagram showing relationships of the F value with the state of the aperture 26 and the appearance state of the ND filter 30. As shown in FIG. 4A, the F value can take values of ten steps between F3.5 to F16, for example. Note that the state of the aperture 26 and the appearance state of the ND filter 30 are preliminarily determined for each F value.

For example, in the case of F3.5, the aperture 26 is in the open state and also the ND filter is in the fully open state. In the case of F4, the aperture 26 is in a narrowed-down state from that in the case of F3.5 and also the ND filter is in the fully open state. In the case of F4.8, the aperture 26 is in the same state as that in the case of F4 and also the ND filter 30 is in a partial application state in which a half of the filter D1 of the ND filter 30 is applied to the aperture 26.

In the case of F5.6, the aperture 26 is in the same state as those in the cases of F4 and F4.8, and also the ND filter 30 is in a fully closed state in which the filter D1 is applied over the whole aperture 26. In the case of F6.8, the aperture 26 is in the same state as those in the cases of F4, F4.8, and F5.6, and also the ND filter 30 is in a partial application state in which each half of the filter D1 and the filter D2 of the ND filter 30 is applied to the aperture 26.

In the case of F8, the aperture is in the same state as those in the cases of F4, F4.8, F5.6, and F6.8, and also the ND filter 30 is in a fully closed state in which the filter D3 of the ND filter 30 is applied over the whole aperture 26. In the case of F9.6, the aperture 26 is in a more narrowed-down state than that in the case of F8, and also the ND filter 30 is in the fully closed state in which the filter D3 of the ND filter 30 is applied over the whole aperture 26.

In the case of F11, the aperture 26 is in a more narrowed-down state than that in the case of F9.6, and also the ND filter 30 is in the fully closed state in which the filter D3 of the ND filter 30 is applied over the whole aperture 26. In the case of F13.6, the aperture 26 is in a more narrowed-down state than that in the case of F11, and also the ND filter 30 is in the fully closed state in which the filter D3 of the ND filter 30 is applied over the whole aperture 26. In the case of F16, the aperture 26 is in a more narrowed-down state than that in the case of F13.6, and also the ND filter 30 is in the fully closed state in which the filter D3 of the ND filter 30 is applied over the whole aperture 26.

FIG. 4C is a diagram showing a relationship between the F value and the vertical resolution. As shown in FIG. 4C, the vertical resolution for F4.8 or F6.8, which provides the partial application state of the ND filter, is abruptly degraded from the vertical resolution for the F value of the one-step previous step or the one-step following step. The vertical resolution for each of the F values except F4.8 or F6.8 changes little compared to the vertical resolution of the one-step previous step or the one-step following step.

FIG. 4B is a diagram showing a data example of the exposure control table representing the relationships among the F value, which determines the state of the aperture 26 and the appearance state of the ND filter 30, the shutter speed S, and the exposure control voltage EV. The data of the exposure control table is stored in the memory 38. The exposure control voltage EV is expressed by a combination of the F value, which determines the state of the aperture 26 and the appearance state of the ND filter 30 against the aperture 26, and the shutter speed S. For example, the shutter speed S takes values between 2 seconds and 1/2048 second and can take values of 25 steps, as shown in FIG. 4B.

Here, the operation of the control section 24 will be considered for the case that the control section 24 calculates the exposure control voltage EV of EV9 from the mode signal supplied from the moving-image/still-image selector switch 36 and the light intensity signal supplied from the light intensity detection section 22. Note that the combination of the F value and the shutter speed S in the exposure control table is denoted by (F, S).

As shown in FIG. 4B, for providing the exposure control voltage EV of EV9, there is a plurality of combinations of the F value and the shutter speed S, such as (F4, S1/32), (F4.8, S1/22), and (F5.6, S1/16). Accordingly, the control section 24 selects one from the above plurality of combinations and controls the aperture blade drive section 28, the ND filter drive section 32, and the shutter drive section 34.

Then, the control section 24, when increasing or reducing the exposure control voltage EV, can avoid the degradation of the vertical resolution by carrying out control so as to read the F value from the exposure control table so as to avoid the F values providing the partial application state of the ND filter, that is, the values of F4.8 and F6.8.

For avoiding the partial application state of the ND filter, the control section 24 determines whether or not a possibility of the partial application state of the ND filter exists, when controlling the aperture blade drive section 28 and the ND filter drive section 32 by using the F value read out from the exposure control table stored in the memory 38. Then, when the possibility of the partial application state of the ND filter is determined not to exist, the control section 24 reads out the shutter speed S corresponding to the F value from the exposure control table. For example, when the control section 24 calculates EV9 and reads F4, since the appearance state of the ND filter 30 for F4 is not the partial application state of the ND filter as shown in FIG. 4A, the control section 24 successively reads 1/32 second as the shutter speed S corresponding to F4.

On the other hand, when the possibility of the partial application state of the ND filter is determined to exist, the control section 24 reads out again the F value from the exposure control table so as to avoid the partial application state of the ND filter. The control section 24 determines whether or not the possibility of the partial application state of the ND filter exists for the F value read out again from the exposure control table, and repeats the above operation. For example, when the control section 24 calculates EV9 and reads out F4.8, since the appearance state of the ND filter 30 for F4.8 is the partial application state of the ND filter as shown in FIG. 4A, the control section 24 reads out the next value of F5.6. Since the appearance state of the ND filter for F5.6 is not the partial application state of the ND filter as shown in FIG. 4A, the control section 24 successively reads out 1/16 second as the shutter speed S corresponding to F5.6.

Then, the control section 24 controls the aperture blade drive section 28 and the ND filter drive section 32 according to the F value which avoids the partial application state of the ND filter, and controls the shutter drive section 34 so as to provide the shutter speed S corresponding to the F value which avoids the partial application state of the ND filter, for carrying out the exposure control.

Next, the operation of the control section 24 will be described for the case that the control section 24 controls the aperture blade drive section 28, the ND filter drive section 32, and the shutter drive section 34 so as to avoid the partial application state of the ND filter for F4.8 and F6.8 according to a program chart, when increasing the exposure control voltage EV from EV9 to EV17.

FIG. 5 is a program chart showing a mode example in which the exposure control is carried out so as to avoid the values of F4.8 and F6.8 according to the exposure control table shown in FIG. 4B. FIGS. 6A and 6B are diagrams showing data contents of the F value and the shutter speed S in the program chart shown in FIG. 5. Note that the program chart defines a data read-out sequence of a part of the exposure control table and is another format of the exposure control table.

For example, the control section 24 selects a program chart shown by the broken line in FIG. 5 among a plurality of the program charts stored in the memory 38, when the mode signal representing the moving image mode is supplied from the moving-image/still-image selector switch 36. It is preferable to select a program chart which minimizes the change of the F value and the shutter speed so as to change the exposure amount naturally. For example, when the exposure control voltage EV is to be changed step by step, it is preferable to change both of the F value and the shutter speed within two steps for the one step change of the exposure control voltage EV, as shown by the program chart indicated by the broken line in FIG. 5.

The control section 24 reads out F3.5 from the program chart shown in FIG. 5, when having calculated a target exposure control voltage EV of EV9 from the mode signal supplied from the moving-image/still-image selector switch 36 and the light intensity signal supplied from the light intensity detection section 22. Then, the control section 24 determines whether or not the state of the ND filter 30 for F3.5 has a possibility of becoming the partial application state of the ND filter. Since the state of the ND filter 30 for F3.5 is not the partial application state of the ND filter as shown in FIG. 4A, the control section 24 reads out $1/45$ second as the shutter speed S corresponding to F3.5. Then, the control section 24 controls the aperture blade drive section 28 and the ND filter drive section 32 according to the F value of F3.5 which avoids the partial application state of the ND filter, and controls the shutter drive section 34 so as to provide the shutter speed S of $1/45$ second, for carrying out the exposure control.

Next, the control section 24 reads out F3.5 from the program chart shown in FIG. 5 when having calculated an exposure control voltage of EV9.5, and since the state of the ND filter 30 for F3.5 is not the partial application state of the ND filter as shown in FIG. 4A, reads out $1/64$ second as the shutter speed S corresponding to F3.5. The control section 24, in the subsequent case in which the state of the ND filter 30 is not the partial application state of the ND filter, carries out the same control as above according to the program chart shown in FIG. 5.

Here, the operation of the control section 24 will be described for the processing after the control section 24 have calculated an exposure control voltage EV of EV 13, read out F value of F4 and a shutter speed S of $1/512$ second from the program chart shown in FIG. 5, and carried out the same control as above for the aperture blade drive section 28, the ND filter drive section 32, and the shutter drive section 34. The control section 24 reads out F4.8 from the program chart shown in FIG. 5 when having calculated an exposure control voltage EV of EV13.5 subsequently to the above processing. Then, the control section 24 determines whether or not the state of the ND filter 30 for F4.8 has a possibility of becoming the partial application state of the ND filter. Since the state of the ND filter 30 for F4.8 is the partial application state of the ND filter as shown in FIG. 4A, the control section 24 skips the state for F4.8 and reads out the F value again. That is, the control section 24 reads out F5.6.

Since the state of the ND filter 30 for F5.6 is not the partial application state of the ND filter as shown in FIG. 4A, the control section 24 reads out $1/358$ second as the shutter speed S corresponding to F5.6. Then, the control section 24 controls the aperture blade drive section 28 and the ND filter drive section 32 according to the F value of F5.6 which avoids the partial application state of the ND filter, and controls the shutter drive section 34 so as to provide the shutter speed S of $1/358$ second, for carrying out the exposure control.

Further, the control section 24, also when having calculated an exposure control voltage EV of EV14.0 and successively calculated an exposure control voltage EV of EV14.5, carries out the same control as above by skipping the partial application state of the ND filter for F6.8 as above.

Next, the operation of the control section 24 will be described for the case where it controls the aperture blade drive section 28, the ND filter drive section 32, and the shutter drive section 34 so as to avoid the partial application state of the ND filter for F4.8 and F6.8 according to the program chart, when the exposure control voltage EV is to be reduced from EV17 to EV9.

The control section 24 reads out F16 from the program chart shown in FIG. 5 when having calculated a target exposure control voltage EV of EV17 from the mode signal supplied from the moving-image/still-image selector switch 36 and the light intensity signal supplied from the light intensity detection section 22. Then, the control section 24 determines whether or not the state of the ND filter 30 for F16 has a possibility of becoming the partial application state of the ND filter. Since the state of the ND filter 30 for F16 is not the partial application state of the ND filter as shown in FIG. 4A, the control section 24 reads out $1/512$ second as the shutter speed S corresponding to F16. Then, the control section 24 controls the aperture blade drive section 28 and the ND filter drive section 32 according to the F value of F16 which avoids the partial application state of the ND filter, and controls the shutter drive section 34 so as to provide the shutter speed S of $1/512$ second, for carrying out the exposure control.

Next, the control section 24, when having calculated an exposure control voltage EV of EV16.5, reads out F13.6 from the program chart shown in FIG. 5, and, since the state of the ND filter 30 for F13.6 is not the partial application state of the ND filter as shown in FIG. 4A, reads out $1/512$ second as the shutter speed S corresponding to F13.6. The control section 24, in the subsequent case in which the state of the ND filter 30 is not the partial application state of the ND filter, carries out the same control as above according to the program chart shown in FIG. 5.

Here, the operation of the control section 24 will be described for the processing after the control section 24 has calculated an exposure control voltage EV of EV 12.5, read out F8 and a shutter speed S of $1/90$ second from the program chart shown in FIG. 5, and carried out the same control as above for the aperture blade drive section 28, the ND filter drive section 32, and the shutter drive section 34. The control section 24, when having calculated an exposure control voltage EV of EV12.0 subsequently to the above processing, reads out F6.8 from the program chart shown in FIG. 5. Then, the control section 24 determines whether or not the state of the ND filter 30 for F6.8 has a possibility of becoming the partial application state of the ND filter. Since the state of the ND filter 30 for F6.8 is the partial application state of the ND filter as shown in FIG. 4A, the control section 24 skips the state for F6.8 and reads out the F value again. That is, the control section 24 reads out F5.6.

Since the state of the ND filter 30 for F5.6 is not the partial application state of the ND filter as shown in FIG. 4A, the control section 24 reads out $\frac{1}{128}$ second as the shutter speed S corresponding to F5.6. Then, the control section 24 controls the aperture blade drive section 28 and the ND filter drive section 32 according to the F value of F5.6 which avoids the partial application state of the ND filter, and controls the shutter drive section 34 so as to provide the shutter speed S of $\frac{1}{128}$ second, for carrying out the exposure control.

Further, the control section 24, also when having calculated an exposure control voltage EV of EV11.5 and successively an exposure control voltage EV of EV 11, carries out the same control as above by skipping the partial application state of the ND filter for F4.8 as above. Note that, when there is not the possibility of the partial application state of the ND filter, the control section 24 preferably carries out the control of providing an appropriate value of a gain AGC to the electrical signal input into the amplifier 1B according to the mode signal supplied from the moving-image/still-image selector switch 36 and the light intensity signal supplied from the light intensity detection section 22.

The control section 24 needs a predetermined time when increasing or reducing the exposure control voltage EV by a step of EV0.5 and controlling the aperture blade drive section 28, the ND filter drive section 32, and the shutter drive section 34. However, after the predetermined time has elapsed, the imaging apparatus 10 is always prepared to have a state of avoiding the partial application state of the ND filter, and it is possible to avoid the degradation of the vertical resolution. Further, while the control of the aperture 26 and the ND filter 30 is an analog control, it is possible to obtain a natural exposure by minimizing the change amounts of F value and the shutter speed S.

While, in the present embodiment, the different program charts are described for the increase and the decrease of the exposure control voltage EV, the same program chart may be used for the increase and the decrease of the exposure control voltage EV. Further, one program chart may be selected from a plurality of program charts depending on a current F value and shutter speed S referred to on the exposure control table. Moreover, various modifications are possible such as one in which a program chart is selected so as to reach a target F value and shutter speed S in the shortest route.

Figure 7:
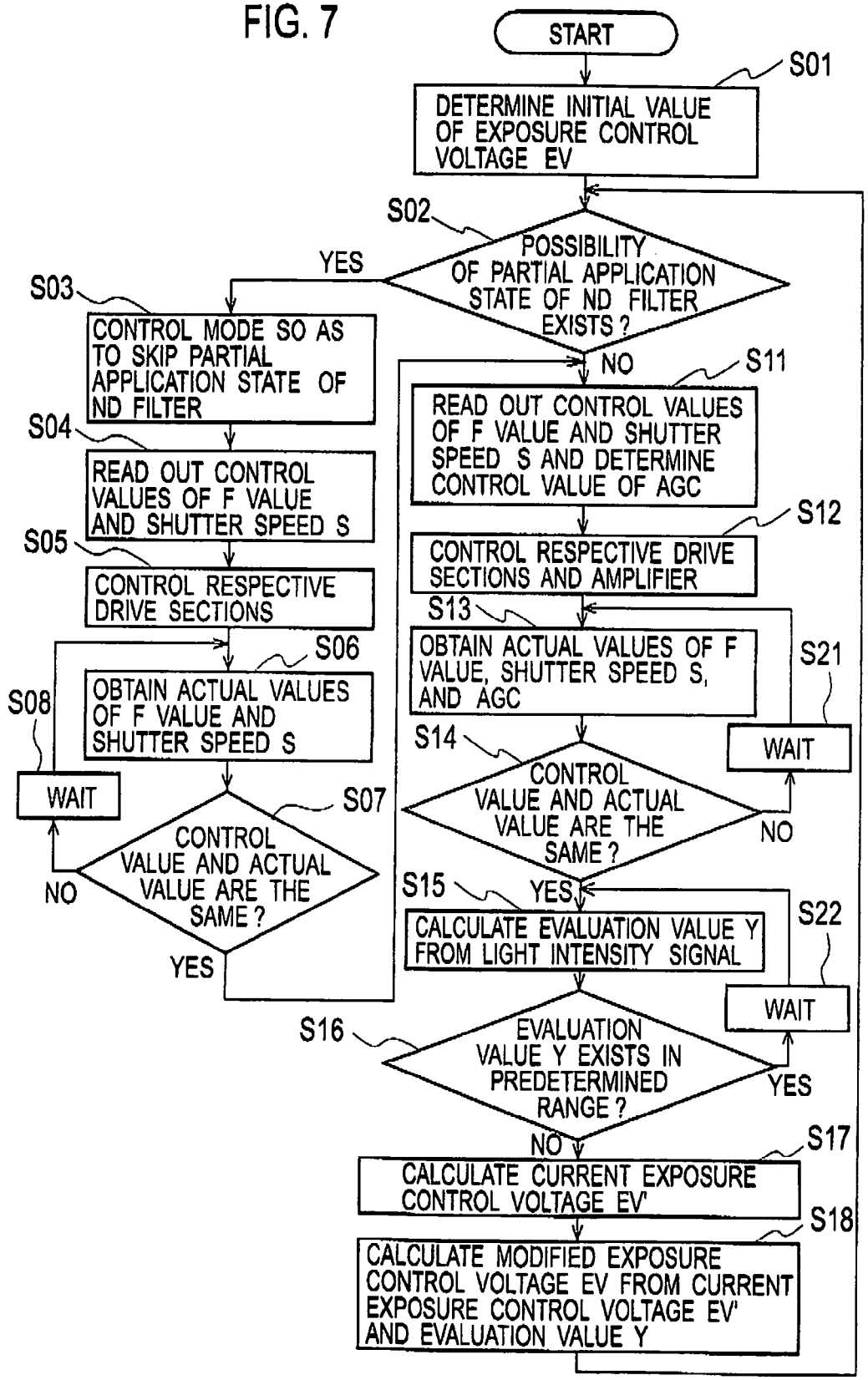
FIG. 7 is a flowchart illustrating an exposure control method according to an embodiment of the present invention.

Next, a method of the exposure control will be described using FIG. 7. FIG. 7 is a flowchart showing a sequence of the exposure control. The control section 24 selects a program chart according to the mode signal supplied from the moving-image/still image selector switch 36 and the light intensity signal supplied from the light intensity detection section 22. The program chart is shown in FIG. 5, for example.

The control section 24, after having selected the program chart, determines an initial value of the exposure control voltage EV according to the mode signal supplied from the moving-image/still image selector switch 36 and the light intensity signal supplied from the light intensity detection section 22 (Step S01). The control section 24 determines whether or not a possibility of the vertical resolution degradation exists for the F value read out for the exposure control voltage EV on the program chart, that is, a possibility of the partial application state of the ND filter exists or not (Step S02).

If it is determined that the possibility of the partial application state of the ND filter exists (Step S02, Y), the control section 24 controls a mode on the program chart so as to skip this F value providing the partial application state of the ND filter (Step S03). Next, the control section 24 reads out the F value after having skipped the F value providing the partial application state of the ND filter on the program chart, and successively reads out a control value of the shutter speed S corresponding to this F value (Step S04).

The control section 24 controls the respective drive sections 28, 32, and 34 so as to provide the control values read out in Step S04 for the F value and the shutter speed S. That is, the control section 24 controls the aperture blade drive section 28 and the ND filter drive section 32 so as to provide the F value read out in Step S04, and controls the shutter drive section 34 so as to provide the shutter speed read out in Step S04 (Step S05).

The control section 24 obtains an actual value of the F value from the positions of the pair of aperture blades 26a and 26b which have been adjusted by the aperture blade drive section 28 and the appearance state of the ND filter 30 which has been adjusted by the ND filter drive section 32, and obtains an actual value of the shutter speed S from the shutter which has been adjusted by the shutter drive section 34 (Step S06).

The control section 24 determines whether or not the control values read out in Step S04 for the F value and the shutter speed S and the actual values obtained in Step S06 for the F value and the shutter speed S meet with each other, respectively (Step S07). In Step S07, if the control section 24 determines that all of the control values and the actual values meet with each other, respectively, (Step S07, Y), the process goes to Step S11, and if the control section 24 determines that some of the values do not meet with each other (Step S07, N), the process returns to Step S06, after having waited for a predetermined time (Step S08).

The operation of the control section 24 will be described for the case that it determines that the possibility of the partial application state of the ND filter does not exist (Step S02, N), or the case that it determines that the control values and the actual values meet with each other, respectively, for the F value and the shutter speed S in Step S07 (Step S07, Y).

The control section 24 reads out the F value corresponding to the exposure control voltage EV from the data in the exposure control table stored in the memory 38 according to the program chart, reads out the shutter speed S corresponding to the F value, and determines the gain AGC (Auto Gain Control) to be provided to the electrical signal input into the amplifier 18 (Step S11). When the possibility of the partial application state of the ND filter does not exist, it is preferable to carry out the control so as to provide an appropriate value of the gain AGC to be provided to the electrical signal input into the amplifier 18 according to the mode signal supplied from the moving-image/still-image selector switch 36 and the light intensity signal supplied from the light intensity detection section 22.

The control section 24 controls the respective drive sections 28, 32, and 34 so as to provide the F value and the shutter speed S read out in Step S11, and controls the gain AGC to be provided to the electrical signal input into the amplifier 18. That is, the control section 24 controls the aperture blade drive section 28 and the ND filter drive section 32 so as to provide the F value read out in Step S11, controls the shutter drive section 34 so as to provide the shutter speed S read out in Step S11, and controls the amplifier 18 so as to provide the gain AGC determined in Step S12 (Step S12).

The control section 24 obtains an actual value of the F value from the positions of the pair of aperture blades 26a and 26b which has been adjusted by the aperture blade drive section 28 and the appearance state of the ND filter 30 which has been adjusted by the ND filter drive section 32, obtains an actual value of the shutter speed S which has been adjusted by the shutter drive section 34, and obtains an actual value of the gain AGC in the amplifier 18 (Step S13).

The control section 24 determines whether or not the control values read out in Step S12 for the F value and the shutter speed S and for the gain AGC determined in Step S12, and the actual values obtained in Step S13 for the F value, the shutter speed S, and the gain AGC, meet with each other, respectively (Step S14). If the control section 24 determines that all of the control values and the actual values meet with each other, respectively, (Step S14, Y), the process goes to Step S15, and if the control section 24 determines that some of the values do not meet with each other (Step S14, N), the process returns to Step S13 after having waited for a predetermined time (Step S21).

The control section 24, when having determined that all the control value and actual values meet with each other, respectively in Step S14, obtains the light intensity signal representing the current brightness of the object from the light intensity detection section 22 and calculates an evaluation value Y from the value of the obtained light intensity signal (Step S15).

The control section 24 determines whether or not the evaluation value Y calculated in Step S15 exists within a predetermined range, that is, whether the exposure control is appropriate or not (Step S16). If the control section 24 determines that the evaluation value Y calculated in Step S15 exists within the predetermined range (Step S16, Y), the process returns to Step S 15 after having waited for a predetermined time (Step S22).

The control section 24, when having determined that the evaluation value Y calculated in Step S15 does not exist within the predetermined range (Step S16, N), obtains an actual value of the F value from the positions of the pair of aperture blades 26a and 26b and the appearance state of the ND filter 30 and obtains an actual value of the shutter speed S, and then calculates a current exposure control voltage EV' (Step S17).

The control section 24 calculates a modified exposure control voltage EV from the current exposure control voltage EV' and the evaluation value Y (Step S18), and returns to Step S02 to repeat the above operation.

As described hereinabove, the imaging apparatus can avoid the partial application state of the ND filter by using the exposure control table which includes the program chart, and thereby can obtain a high quality image by suppressing the degradation of the vertical resolution of the optical object image, even in any exposure control state. Note that, while the above-described embodiment has been described using an example in which one step of the F value steps is to be skipped for avoiding the partial application state of the ND filter, the present invention can be applied to the case that two or more steps need to be skipped. Further, as far as the partial application state of the ND filter can be avoided, various modifications are possible within a range not departing from the gist of the present invention.

What is claimed is:

1. An imaging apparatus comprising:
   a shutter drive section opening and closing a shutter for a light receiving surface of a solid state image sensor;
   an aperture blade drive section driving an aperture blade forming an aperture for an imaging lens;
   an ND filter drive section adjusting a position of an ND filter against the aperture, the ND filter adjusting light intensity of an optical object image received on the light receiving surface of the solid state image sensor;
   a light intensity detection section detecting the light intensity of the optical object image received on the light receiving surface of the solid state image sensor and outputting a light intensity signal based on the light intensity of the optical object image;
   a memory storing an exposure control table indicating corresponding relationships among an F value determined by an area of the aperture and the position of the ND filter against the aperture, a shutter speed in opening and closing the shutter, and an exposure control voltage representing an exposure amount; and
   a control section calculating the target exposure control voltage from the light intensity signal; reading out the F value corresponding to the exposure control voltage from the exposure control table; determining whether or not there exists a possibility of a partial application state of the ND filter, in which the ND filter is applied to a part of the aperture, when controlling the aperture blade drive section and the ND filter drive section using the F value; reading out the shutter speed corresponding to the F value from the exposure control table if the possibility of the partial application state of the ND filter is determined not to exist; reading out the F value again from the exposure control table so as to avoid the partial application state of the ND filter if the possibility of the partial application state of the ND filter is determined to exist and reading out the shutter speed corresponding to the F value which is read out again from the exposure control table; controlling the aperture blade drive section and the ND filter drive section according to the F value read out from the exposure control table; and controlling the shutter drive section according to the shutter speed read out from the exposure control table, for carrying out exposure control.

2. The imaging apparatus according to claim 1, wherein the partial application state of the ND filter includes a state of applying at least two regions of the ND filter to the aperture, the two regions being different in optical density.

3. The imaging apparatus according to claim 1, further comprising
   an amplifier amplifying with a predetermined gain an electrical signal based on the light intensity of the optical object image received by the light receiving surface of the solid state image sensor,
   wherein the control section, when determining that the possibility of the partial application state of the ND filter does not exist, determines the gain to be provided to the electrical signal by the amplifier and carries out control so that the amplifier provides the gain to the electrical signal.

4. The imaging apparatus according to claim 1, wherein the control section calculates the exposure control voltage depending on a kind of a shot image.

5. An exposure control method for carrying out exposure control of an imaging apparatus, comprising:
   detecting light intensity of an optical object image received on a light receiving surface of a solid state image sensor;
   outputting a light intensity signal based on the light intensity of the optical object image;
   calculating an exposure control voltage representing a target exposure amount from the light intensity signal;

reading an F value corresponding to the exposure control voltage from a memory storing an exposure control table, which indicates correspondence relationships among the F value determined by an area of an aperture adjusted by drive of an aperture blade for an imaging lens and a position of an ND filter against the aperture, the ND filter adjusting the light intensity of the optical object image received by the light receiving surface of the solid state image sensor, a shutter speed in opening and closing a shutter for the light receiving surface of the solid state image sensor, and the exposure control voltage;

determining whether or not there exists a possibility of a partial application state of the ND filter, in which the ND filter is applied to a part of the aperture, when controlling drive of the aperture blade and the ND filter using the F value;

reading out the shutter speed corresponding to the F value from the exposure control table if the possibility of the partial application state of the ND filter is determined not to exist;

reading out the F value again from the exposure control table so as to avoid the partial application state of the ND filter if the possibility of the partial application state of the ND filter is determined to exist, and reading out the shutter speed corresponding to the F value which is read out again from the exposure control table;

carrying out control so as to drive the aperture blade and the ND filter according to the F value read out from the exposure control table; and carrying out control so as to drive the shutter according to the shutter speed read out from the exposure control table.

6. The exposure control method according to claim 5, wherein the partial application state of the ND filter includes a state of applying at least two regions of the ND filter to the aperture, the two regions being different in optical density.

7. The exposure control method according to claim 5, further comprising determining a gain of an amplifier amplifying an electrical signal which is based on the light intensity of the optical object image received by the light receiving surface of the solid state image sensor and carrying out control so that the amplifier provides the gain to the electrical signal, if the possibility of the partial application state of the ND filter is determined not to exist.

8. The exposure control method according to claim 5, wherein the exposure control voltage is calculated depending on a kind of a shot image.

* * * * *